United States Patent
Lind et al.

(10) Patent No.: US 9,821,502 B2
(45) Date of Patent: Nov. 21, 2017

(54) MULTI-ORIFICE DEPOSITION NOZZLE FOR ADDITIVE MANUFACTURING

(71) Applicant: UT-BATTELLE, LLC, Oak Ridge, TN (US)

(72) Inventors: Randall F. Lind, Loudon, TN (US); Brian K. Post, Knoxville, TN (US); Colin L. Cini, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 313 days.

(21) Appl. No.: 14/852,188

(22) Filed: Sep. 11, 2015

(65) Prior Publication Data

US 2017/0072614 A1 Mar. 16, 2017

(51) Int. Cl.
| | |
|---|---|
| *B29C 47/12* | (2006.01) |
| *B29C 67/00* | (2017.01) |
| *B33Y 30/00* | (2015.01) |
| *B29C 64/106* | (2017.01) |
| *B29C 64/20* | (2017.01) |

(52) U.S. Cl.
CPC .......... *B29C 47/124* (2013.01); *B29C 64/106* (2017.08); *B29C 64/20* (2017.08); *B33Y 30/00* (2014.12)

(58) Field of Classification Search
CPC ....... C33Y 10/00; B33Y 30/00; B29C 47/124; B29C 47/12; B29C 64/118; B29C 64/209; B29C 67/0055; B29C 67/0085
See application file for complete search history.

(56) References Cited

U.S. PATENT DOCUMENTS

| | | | | |
|---|---|---|---|---|
| 5,121,329 A | * | 6/1992 | Crump | B22F 3/115 228/180.5 |
| 5,622,216 A | * | 4/1997 | Brown | B22D 11/00 164/71.1 |
| 5,738,817 A | * | 4/1998 | Danforth | B29C 41/36 264/255 |
| 5,997,795 A | * | 12/1999 | Danforth | B29C 33/3842 264/219 |
| 6,113,696 A | * | 9/2000 | Tseng | B22F 3/002 118/313 |
| 2001/0027819 A1 | * | 10/2001 | Wages | A61M 25/0029 138/115 |
| 2016/0009029 A1 | * | 1/2016 | Cohen | B29C 67/0085 264/493 |
| 2016/0230283 A1 | * | 8/2016 | Tseliakhovich | B33Y 10/00 |
| 2017/0173879 A1 | * | 6/2017 | Myerberg | B29C 67/0081 |
| 2017/0182701 A1 | * | 6/2017 | Ryan | B29C 47/124 |
| 2017/0210069 A1 | * | 7/2017 | Stubenruss | B29C 67/0055 |
| 2017/0252815 A1 | * | 9/2017 | Fontana | B22F 3/115 |

* cited by examiner

*Primary Examiner* — Jason L Lazorcik
(74) *Attorney, Agent, or Firm* — Pauley Erickson & Kottis

(57) ABSTRACT

An additive manufacturing extrusion head includes a nozzle for accepting and depositing a heated material onto a work surface and/or part. The nozzle includes a valve body and an internal poppet body moveable between positions to permit deposition of at least two bead sizes of heated material onto a work surface and/or part.

16 Claims, 4 Drawing Sheets

MULTI-ORIFICE DEPOSITION NOZZLE FOR ADDITIVE MANUFACTURING

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to enhanced additive manufacturing using a deposition nozzle having a selectable orifice size.

BACKGROUND OF THE INVENTION

Additive manufacturing may be used to quickly and efficiently manufacture complex three-dimensional components layer-by-layer, effectively forming the complex component. Such additive manufacturing may be accomplished using polymers, alloys, powders, solid wire or similar feed stock materials that transition from a liquid or granular state to a cured, solid component.

Polymer-based additive manufacturing is presently accomplished by several technologies that rely on feeding heated polymer materials through a nozzle that is precisely located over a substrate. Parts are manufactured by the deposition of new layers of materials above the previously deposited layers.

In general, additive manufacturing selectively adds material in a layered format enabling the efficient fabrication of incredibly complex components. Unlike subtractive techniques that require additional time and energy to remove unwanted material, additive manufacturing deposits material only where it is needed making very efficient use of both energy and raw materials. This can lead to significant time, energy, and cost savings in the manufacture of highly advanced components for the automotive, biomedical, aerospace and robotic industries.

In fact, additive manufacturing is a manufacturing technique in which it may be faster, cheaper, and more energy efficient to make more complex parts. However, wide scale adoption of this technology requires a non-incremental improvement in production rates and component scale without sacrificing resolution.

Currently available fused deposition manufacturing (FDM) systems produce parts with high resolution (small deposition nozzles) but at low throughput or they produce parts with low resolution (large deposition nozzles) and high throughput. It is very desirable to achieve both high resolution and high throughput of material on a FDM system. This could be accomplished by equipping the FDM system with nozzles of selectable diameter. The small diameter would be employed at the part boundaries where high resolution is required and the large diameter nozzle employed for low resolution infill. It is also desirable that these nozzles share the same polymer delivery system and have the same centerline. Low additional mass is also desirable where the deposition head is required to execute high acceleration motion.

As such, it is desirable to maintain a controlled application of material onto the deposit surface. A single nozzle with a large orifice may result in a fast build with high throughput of material but with beads of material that are too large with poor resolution in the resulting build. A single nozzle with a small orifice may result in good resolution but poor throughput resulting in slow builds.

The subject invention improves the deposition quality and speed of additively manufactured parts by coaxially adjusting the nozzle orifice during deposition. The subject invention is further designed to include multiple deposit configurations including a stop configuration.

SUMMARY OF THE INVENTION

According to a preferred embodiment of this invention, an extrusion nozzle includes two selectable orifice sizes. The endpoint or contact plane of the nozzle preferably remains in the same position for either orifice thereby enabling a consistent build. Concentricity of the nozzles prevents restriction of the workspace. The subject invention is compact and requires low actuation forces because the design is nearly pressure balanced. In addition, an internal volume of the nozzle does not change when switching from one orifice to the other. In one preferred embodiment of the invention, the nozzle further includes a shut-off position.

As a result, the subject invention improves the deposition quality and speed of additively manufactured parts by selectively adjusting the nozzle orifice during deposition to provide the desired bead size without delay.

Other objects and advantages will be apparent to those skilled in the art from the following detailed description taken in conjunction with the appended claims and drawings.

DETAILED DESCRIPTION OF THE INVENTION

The present invention provides a component manufactured using an advanced manufacturing process wherein a supply of working material or feedstock is provided to a deposition system. The feedstock is then preferably heated and deposited in a desired position through a nozzle during a build of the component. The build as described herein may occur within an oven, heated bed and/or outside of such a system and at atmospheric temperature.

Figure 1:
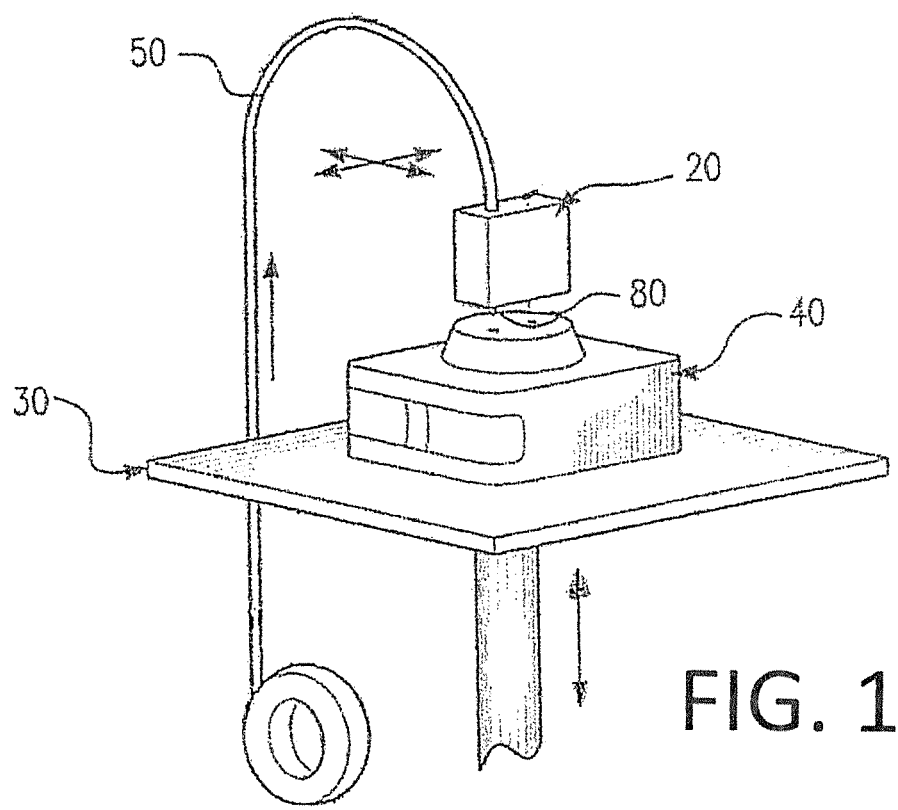
FIG. 1 is a schematic of a conventional polymer extrusion system that feeds a polymer filament into a liquefier to extrude a material.

Conventional polymer extrusion systems feed a polymer filament into a liquefier to extrude a material, such as shown in the simplified schematic of FIG. 1. As shown a conventional polymer extrusion system uses a moveable print head 20 positioned with respect to a work surface 30 to create a desired work piece, component, or part 40. As shown in FIG. 1, a polymer filament 50, or similar deposition material, may be fed through the print head 20 using drive wheels or a similar mechanism to draw the polymer filament 50 through a heating element within the nozzle 80 to liquefy and extrude the feed material through a nozzle 80 and onto the part 40. As the part is constructed, the work surface 30 and/or the print head 20 may be adjusted to accommodate the material added to the part 40. FIG. 1 is intended as one schematic example of an additive manufacturing machine suitable for use in connection with the nozzle 80 described herein. For instance, although a polymer filament 50 is shown, the deposition material may be an alternative form such as pelletized, powdered or other suitable materials that are heated for deposition.

Suitable polymers and/or filaments for use in connection with the nozzle 80 include, for instance, ABS, polycarbonate, PLA, Ultem, Nylon, or PPSF/PPSU. The control of the motion of the extruder and/or the output of the extruder controls the development of a part. Different materials provide different mechanical properties. For example, ABS is a low cost durable material. Ultem is a very strong, stiff high temperature material ideal for tooling. Polycarbonate is a durable material that can be used for functional parts. PPSF/PPSU is a sterilizable, strong high-performance plastic ideal for biomedical applications.

Figures 2A, 2B:
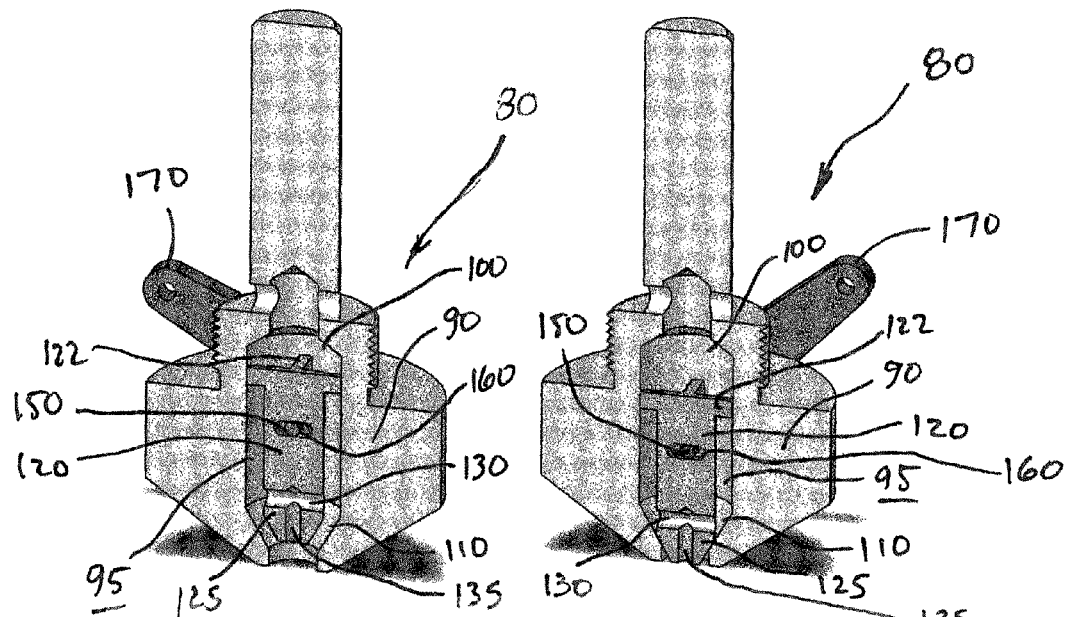
FIG. 2A is a schematic cross-sectional side view of a nozzle in a first position according to one embodiment of this invention.
FIG. 2B is a schematic cross-sectional side view of the nozzle shown in FIG. 2A in a second position according to one embodiment of this invention.

FIGS. 2A and 2B show one embodiment of a dual-flow nozzle 80 for discharging heated material from a fused deposition additive manufacturing machine. The nozzle 80 preferably includes a valve body 90 defining a central chamber 95. The valve body 90 further includes a tapered inlet 100 for accepting heated material through the valve body 90 and into the central chamber 95. In addition, the valve body 90 preferably includes a tapered outlet 110 for discharging the heated material from the central chamber 95 and through the valve body 90 and onto the part 40 and/or work surface 30, such as schematically shown in FIG. 1.

In addition, the nozzle 80 in accordance with the invention preferably includes a poppet body 120 disposed within the central chamber 95 of the valve body 90. The valve body 90 preferably includes a central axis and the poppet body 120 preferably also includes a central axis, wherein the axes of each are coaxial. The poppet body 120 preferably moves axially between two endpoints within the central chamber 95, as shown in FIGS. 2A and 2B respectively. The poppet body 120 may be positionable in any number of positions between the two endpoints or may be positionable in just two positions between the endpoints, as described in more detail below. The poppet body 120 preferably includes a tapered lower section 125 that defines an inlet port 130 for accepting material from the central chamber 95 and an exit port 135 connected to the inlet port 130 for discharging the heated material from the exit port 135 and through the poppet body 120.

As best shown in FIGS. 2A and 2B, the poppet body 120 preferably includes three or more spaced apart standoffs 122 that span between the poppet body 120 and the valve body 90 defining the central chamber 95 to ensure that the poppet body 120 is centered in the central chamber 95. Such standoffs 122 further permit the passage of heated material between them so as to not significantly disrupt the free flow of material through the nozzle 80.

As described, the subject nozzle preferably includes at least two positions for deposition of heated material—a first position for extruding a first, larger sized bead, as shown in FIG. 2A, and a second position for extruding a second, smaller sized bead, as shown in FIG. 2B. When the poppet body 120 is in the first position, shown in FIG. 2A, the tapered lower section 125 is not seated with the tapered outlet 110 of the valve body 90, and the heated material enters the valve body 90 through the tapered inlet 100 and is discharged from the tapered outlet 110 of the valve body 90 as a large bead. When the poppet body 120 is in the second position, shown in FIG. 2B, the tapered lower section 125 is seated with the tapered outlet 110 of the valve body 90 and the heated material is discharged from the exit port 135 of the poppet body 120 as a small bead.

According to a preferred embodiment, the tapered outlet 110 of the valve body 90 and the exit port 135 of the poppet body 120 discharge heated material at the same planar position of the nozzle 80, as best illustrated in FIG. 2B. In this manner, a build is controllable and consistent whether the nozzle 90 is discharging a large bead of material from the first position or a small bead of material from the second position. According to a preferred embodiment of the nozzle 80, the inlet port 130 of the poppet body 120 may be perpendicular to the exit port 135 of the poppet body 120.

Figures 3A, 3B, 3C:
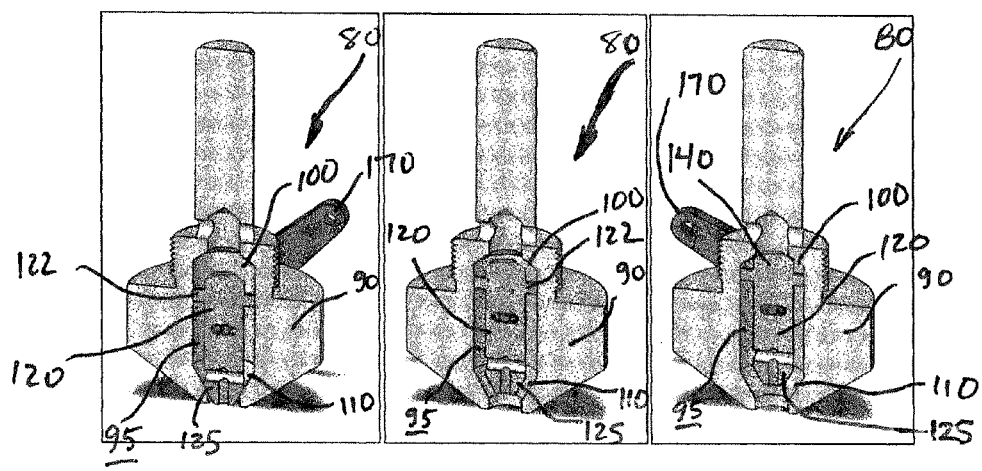
FIG. 3A is a schematic cross-sectional side view of a nozzle in a second position according to one embodiment of this invention.
FIG. 3B is a schematic cross-sectional side view of the nozzle shown in FIG. 3A in a first position according to one embodiment of this invention.
FIG. 3C is a schematic cross-sectional side view of the nozzle shown in FIG. 3A in a third position according to one embodiment of this invention.
Figure 4:
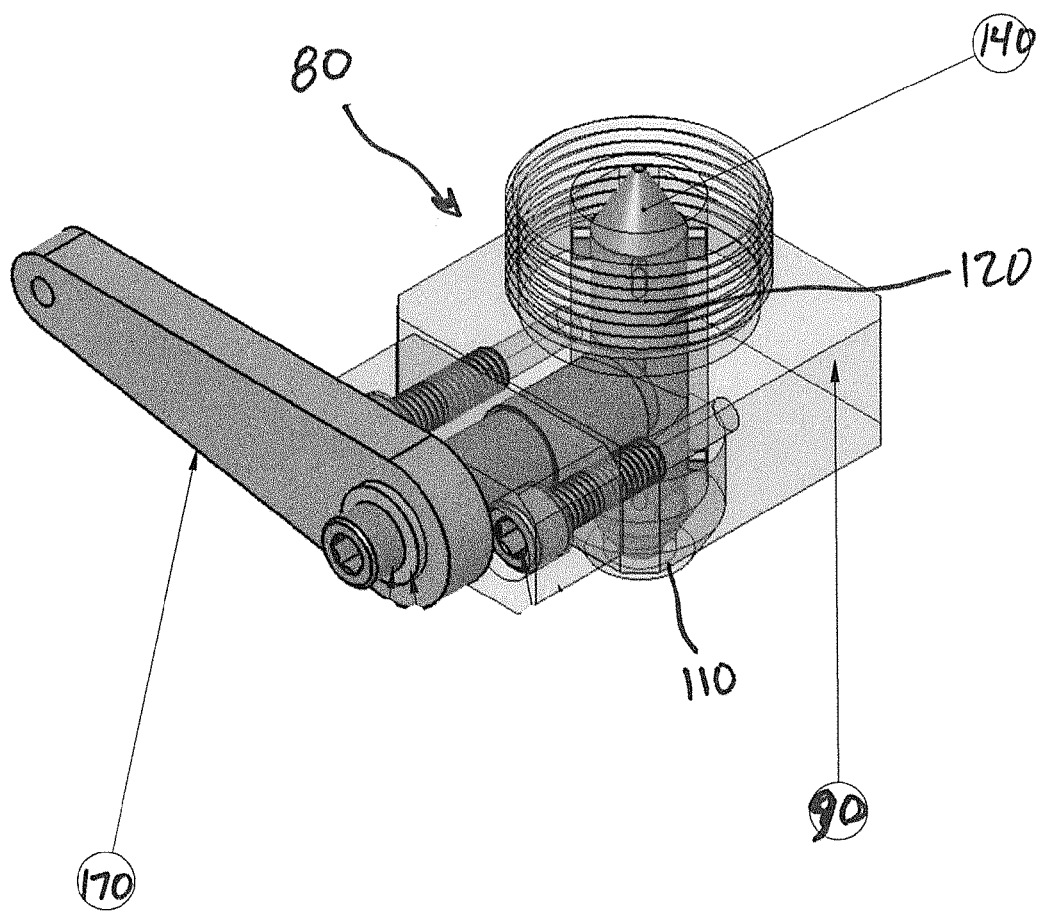
FIG. 4 is a side perspective view of a nozzle according to one embodiment of this invention.

FIGS. 3A-3C show an additional embodiment of the subject invention including the second position of the nozzle 80 in FIG. 3A, the first position of the nozzle at FIG. 3B and a further, third position, shown in FIG. 3C, which completely stops the flow of material through the nozzle 80, effectively shutting it off. According to one embodiment, the poppet body 120 includes a tapered upper section 140 and, in the third position shown in FIG. 3C, the tapered upper section 140 is seated with the tapered inlet 100 of the valve body 90 and the heated material can not enter the tapered inlet 100 of the valve body 90. This position effectively stops the flow of material, which is useful when repositioning the nozzle or starting a new layer or part.

According to a preferred embodiment of the invention, and as shown in FIGS. 1-3, a position of the poppet body 120 is selectable by positioning an eccentric shaft 150 within an elongated slot 160 defined by the poppet body 120. Preferably, a lever arm 170, or similar actuation member, rotates the eccentric shaft 150 into the desired position to move the poppet body 120 through the valve body 90 and between and/or among the first position, second position and/or third position.

Figure 5:
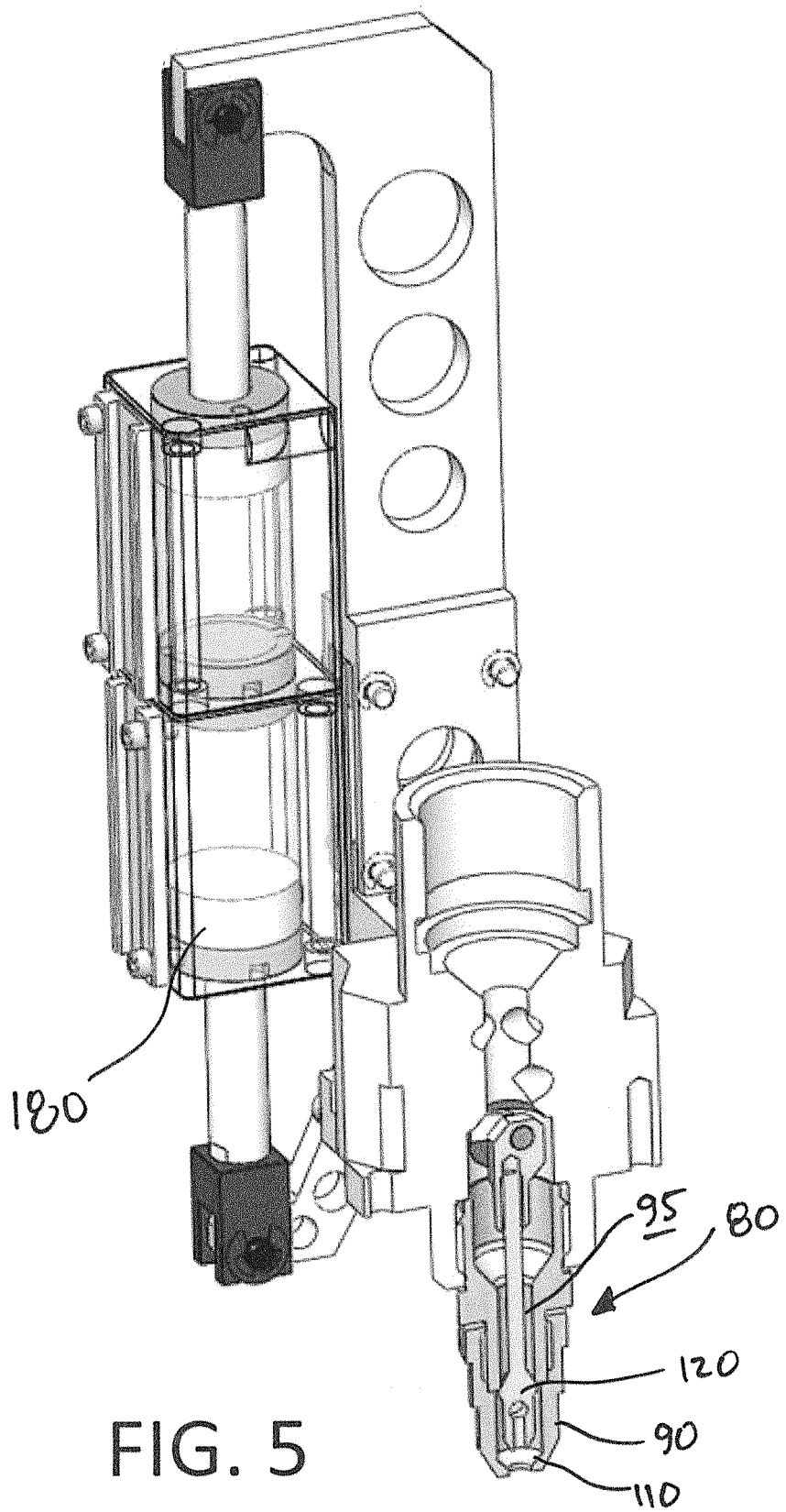
FIG. 5 is a side perspective cutaway view of a nozzle assembly according to one embodiment of this invention.

FIG. 5 shows an additional embodiment of an assembly including the nozzle 80 wherein one or more pneumatic actuators 180 are used to control the position of the poppet body 120 within the nozzle 80. In other examples, hydraulic or electric actuators may be used.

In operation, an additive manufacturing nozzle 80 as described accepts feedstock in one or more forms and deposits a resulting heated material onto a work surface and/or part. The feedstock 100 may be a filament 50, such as described above, pelletized material or similar material supply that is capable of a generally continuous feed from a supply to the nozzle 80. The nozzle 80 then feeds the heated material in one of at least two bead sizes onto a substrate at a deposition plane. The substrate may include a work surface 30, such as described above in connection with exemplary FIG. 1, or at least a portion of the part 40 in process. The nozzle 80 thereby traverses the build and deposits material in a desired bead size until the part or portion of the part is complete. In some examples, the nozzle includes a heating device such as an inductive or resistance heater.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A variable diameter nozzle for discharging heated material from a fused deposition additive manufacturing machine, the nozzle comprising:
    a valve body defining a central chamber, a tapered inlet for accepting heated material through the valve body and into the central chamber, and a tapered outlet for discharging the heated material from the central chamber and through the valve body;
    a poppet body disposed within the central chamber, the poppet body having a tapered upper section, a mid body section, and a tapered lower section that defines an inlet port for accepting material from the central chamber and an exit port connected to the inlet port for discharging the heated material from the exit port and through the poppet body; and
    wherein, when the poppet body is in a first position and the tapered lower section is not seated with the tapered outlet and the tapered upper section is not seated with the tapered inlet, the heated material enters the valve body through the tapered inlet and is discharged from the tapered outlet of the valve body as a large bead, and
    when the poppet body is in a second position and the tapered lower section is seated with the tapered outlet of the valve body, the heated material is discharged from the exit port of the poppet body as a small bead, and
    when the poppet body is in a third position and the tapered upper section is seated with the tapered inlet of the valve body, the heated material does not enter the tapered inlet of the valve body.

2. The nozzle of claim 1 wherein said valve body includes a central axis and said poppet body includes a central axis and wherein the axes are coaxial.

3. The nozzle of claim 1 wherein said poppet position is selectable by positioning an eccentric shaft within an elongated slot defined by the poppet body.

4. The nozzle of claim 3 wherein the eccentric shaft is rotated with a lever arm.

5. The nozzle of claim 1 wherein the tapered outlet of said valve body or the exit port of said poppet body discharge heated material at the same planar position.

6. The nozzle of claim 1 wherein said poppet includes three or more spaced apart standoffs that span between the poppet and said valve body to ensure the poppet is centered in the central chamber.

7. The nozzle of claim 1 wherein the nozzle is heated.

8. The nozzle of claim 1 wherein the inlet port of the poppet is perpendicular to the exit port.

9. A variable diameter nozzle for discharging heated material from a fused deposition additive manufacturing machine, the nozzle comprising:
    a valve body defining a central chamber, a tapered inlet for accepting heated material through the valve body and into the central chamber, and a tapered outlet for discharging the heated material from the central chamber and through the valve body;
    a poppet body disposed within the central chamber, the poppet body having a tapered lower section that defines an inlet port for accepting material from the central chamber and an exit port connected to the inlet port for discharging the heated material from the exit port and through the poppet body; and
    wherein, when the poppet is in a first position and the tapered lower section is not seated with the tapered outlet, the heated material enters the valve body through the tapered inlet and is discharged from the tapered outlet of said valve body as a large bead, and when the poppet is in a second position and the tapered lower section is seated with the tapered outlet of the valve body, the heated material is discharged from the exit port of said poppet as a small bead.

10. The nozzle of claim 9 wherein, when the poppet includes a tapered upper section and wherein, in a third position, the tapered upper section is seated with the tapered inlet of the valve body, and the heated material does not enter the tapered inlet of the valve body.

11. The nozzle of claim 9 wherein said valve body includes a central axis and said poppet includes a central axis and wherein the axes are coaxial.

12. The nozzle of claim 9 wherein said poppet position is selectable by positioning an eccentric shaft within an elongated slot defined by the poppet body.

13. The nozzle of claim 12 wherein the eccentric shaft is rotated with a lever arm.

14. The nozzle of claim 9 wherein the tapered outlet of said valve body or the exit port of said poppet body discharge heated material at the same planar position.

15. The nozzle of claim 9 wherein said poppet includes three or more spaced apart standoffs that span between the poppet and said valve body to ensure the poppet is centered in the central chamber.

16. The nozzle of claim 9 wherein the inlet port of the poppet is perpendicular to the exit port.

* * * * *